United States Patent Office 3,219,602
Patented Nov. 23, 1965

3,219,602
TRIETHANOLAMINE BORATE CATALYZED CONDENSATION OF BIS-PHENOL A GLYCIDYL ETHERS WITH POLYMERIC FAT ACIDS
James R. Scheibli, Oakland, Calif., assignor to Shell Oil Company, New York, N.Y., a corporation of Delaware
No Drawing. Filed Feb. 13, 1962, Ser. No. 172,886
8 Claims. (Cl. 260—18)

This invention relates to new epoxy-containing materials and a method for their preparation. More particularly, the invention relates to the preparation of epoxy-containing condensates of polyepoxides and acidic materials and to their polymers.

Specifically, the invention provides a process for preparing a linear acetone-soluble epoxy-containing condensate which comprises adding an acidic material of the group consisting of polycarboxylic acids, polycarboxylic acid anhydrides and mixtures thereof to at least 1.5 times the chemical equivalent amount of a polyepoxide containing more than one vic-epoxy group and having no additional substituent capable of reacting with said acidic material other than hydroxyl in the presence of a tertiary amine borate, particularly triethanolamine borate. The expression "equivalent amount" as used herein refers to that amount needed to furnish one acidic group per epoxy group. The process of the present invention is preferably performed by adding the acidic materials, preferably in small increments over a period of time, to at least 1.5 times the equivalent amount of the polyepoxide, and more preferably from about 1.5 times to about 4 times, in the presence of tertiary amine borates.

The invention further provides insoluble infusible products obtained by contacting the above-described epoxy-containing condensates with epoxy curing agents, such as, for example, amines, polybasic acid anhydrides, $BF_3$ and $BF_3$-complexes.

Linear epoxy-containing condensates of polybasic acids and polyepoxides have been prepared in the presence of catalysts, such as, tertiary amines and quaternary ammonium salts. While the epoxy-containing adducts can be cured with conventional epoxy curing agents to form products having excellent resistance to water and solvents, they still have shelf lives which are too short to be useful for some applications. Faster reaction rates for the preparation of the epoxy-containing precondensates are also desirable so that the condensates may be prepared by a continuous process more easily.

It is therefore an obejct of the invention to provide a process for preparing epoxy-containing materials which are particularly suited for use in preparing surface coatings. It is another object to provide a process for preparing epoxy-containing materials in shorter time by providing faster reaction rates. It is another object to provide a process for preparing epoxy-containing materials which have extended shelf life. It is still another object to provide a process for preparing epoxy-containing materials which can be cured to form products having excellent flexibility, water resistance and solvent resistance. It is a further object to provide epoxy-containing materials having increased shelf life. It is still a further object to provide epoxy-containing materials that can be readily cured with epoxy curing agents to form hard chemical resistant products. Other objects and advantages of the invention will be apparent from the following detailed description thereof.

It has now been found that these and other objects may be accomplished by the process which comprises adding an acidic material of the group consisting of polycarboxylic acids, polycarboxylic acid anhydrides and mixtures thereof to at least 1.5 times the chemical equivalent amount of a polyepoxide containing more than one vic-epoxy group and having no additional substituent capable of reacting with said acidic material other than hydroxyl in the presence of a tertiary amine borate.

It has been found that these epoxy-containing materials prepared by the process of the invention have increased shelf life while still retaining other desirable properties, such as, for example, these epoxy-containing condensates have been found to be particularly suited for use in the preparation of surface coatings as they can be cured with other epoxy curing agents to form very attractive films. The films, due in part to the high molecular weight of the products, are usually hard and strong and are quite distensible, and, due in part to their epoxy composition, possess excellent resistance to chemicals and have good adhesion. These condensates also give cured films which have outstanding resistance to water and thus can be used alone or in combination with other epoxy-containing surface coating compositions to give water-resistant varnishes and the like. The epoxy-containing condensates prepared from aliphatic or cycloaliphatic polybasic acids and/or anhydrides are especially preferred as they possess excellent compatibility with many materials, such as, asphaltic materials, and, when cured give coatings having superior flexibility.

The polyepoxide materials to be used in preparing the condensates of the present invention comprise those organic materials which have more than one vic-epoxy group, i.e., more than one

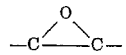

group, which group may be in a terminal position, i.e., a

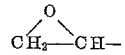

group, or in an internal position, i.e., a

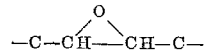

The polyepoxides may be saturated or unsaturated, aliphatic, cycloaliphatic, aromatic or heterocyclic and may be substituted with substituents, such as chlorine, hydroxyl groups, ether radicals, and the like.

Examples of such polyepoxides, include, among others, 1,4 - bis(2,3-epoxypropoxy)benzene, 1,3-bis(2,3-epoxypropoxy)benzene, 4,4' - bis(2,3-epoxypropoxy)diphenyl ether, 1,8 - bis(2,3-epoxypropoxy)octane, 1,4-bis(2,3-epoxypropoxy)cyclohexane, 4,4' - bis(2 - hydroxy-3,4'-epoxybutoxy)diphenyl dimethylmethane, 1,3 - bis(4,5-epoxypentoxy)-5 - chlorobenzene, 1,4 - bis(3,4 - epoxybutoxy)-2-cyclorocyclohexane, 1,3-bis(2-hydroxy-3,4-epoxybutoxy)benzene, 1,4-bis(2-hydroxy - 4,5 - epoxypentoxy) benzene.

Other examples include the epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl) propane (Bis-phenol A), 2,2-bis(4-hydroxyphenol)butane, 4,4'-dihydroxybenzophenone, bis(4-hydroxyphenyl) ethane, 2,2-bis(4-hydroxyphenyl)pentane and 1,5-dihydroxynaphthalene. The halogen-containing epoxides may be further exemplified by 3-chloro-1,2-epoxybutane, 3-bromo - 1,2 - epoxyhexane, 3-chloro-1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four of the glycidyl polyethers of dihydric phenols will be illustrated below. Unless otherwise specified, parts indicated are parts by weight.

PREPARATION OF GLYCIDYL POLYETHERS OF DIHYDRIC PHENOLS

Polyether A

About 2 moles of 2,2-bis(4-hydroxyphenyl)propane was dissolved in 10 moles of epichlorohydrin and 1% to 2% water added to the resulting mixture. The mixture was then brought to 80° C. and 4 moles of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal quantity by weight of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value eq./100 g. of 0.50. For convenience this product will be referred to hereinafter as Polyether A.

Polyether B

A solution consisting of 11.7 parts of water, 1.22 parts of sodium hydroxide, and 13.38 parts of 2,2-bis(4-hydroxyphenyl)propane was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at a temperature of 20° C. to 30° C. was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durrans' Mercury Method and a molecular weight of 483. The product had an epoxy value eq./100 g. of 0.40. For convenience, this product will be referred to as Polyether B.

Polyether C

By using a smaller ratio of epichlorohydrin to bis-phenol, a glycidyl polyether of higher melting point was obtained. Thus, Polyether C was obtained in the same manner as Polyether B except that for every mole of bis-phenol there was used 1.57 moles of epichlorohydrin and 1.88 moles of sodium hydroxide. This provided a product having a melting point of about 70° C., a molecular weight of 900, and an epoxide value of 0.20 eq./100 g.

Polyether D

This glycidyl polyether of still higher melting point was prepared in like manner to that of Polyether B except that for each mole of bis-phenol there was employed 1.22 moles of epichlorohydrin and 1.37 moles of sodium hydroxide. The resulting product had a melting point of 98° C., a molecular weight of 1400 and an epoxide value of 0.103 eq./100 g.

The glycidyl polyethers of polyhydric phenols obtained by condensing the polyhydric phenols with epichlorohydrin as described above, are also referred to as "ethoxyline" resins. See Chemical Week, Vol. 69, page 27, for September 8, 1951.

Another group of polyepoxides comprises the polyepoxypolyethers obtained by reacting, preferably in the presence of an acid-acting compound, such as hydrofluoric acid, one of the aforedescribed halogen-containing epoxides, such as epichlorohydrin, with a polyhydric alcohol, and subsequently treating the resulting product with an alkaline component. As used herein and in the claims, the expression "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane, bis(4-hydroxycyclohexyl)dimethylmethane and the like.

The preparation of one of these polyepoxide polyethers may be illustrated by the following:

PREPARATION OF GLYCIDYL POLYETHERS OF POLYHYDRIC ALCOHOLS

Polyether E

About 276 parts (3 moles) of glycerol was mixed with 832 parts (9 moles) of epichlorohydrin. To this reaction mixture was added 10 parts of diethyl ether solution containing about 4.5% boron trifluoride. The temperature of this mixture was between 50° C. and 75° C. for about 3 hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The polyglycidyl ether, in amounts of 261 parts, was a pale yellow viscous liquid. It has an epoxide value of 0.671 equivalent per 100 grams and the molecular weight was 324 as measured ebullioscopically in dioxane solution. The epoxy equivalency of this product was 2.13. For convenience, this product will be referred to hereinafter as Polyether E.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products, preferably have an epoxy equivalency greater than 1.0, and still more preferably between 1.1 and 4 and a molecular weight between 300 and 1000.

Another group of polyepoxides include the epoxy esters of polybasic acids, such as diglycidyl phthalate and diglycidyl adipate, diglycidyl tetrahydrophthalate, diglycidyl maleate, epoxidized dimethallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soybean, perilla, oiticica, tung, walnut and dehydrated castor oil, methyl linoleate, butyl linolinate, ethyl 9,12-octadecadienoate, butyl 9,12,15-octadecatrienoate, ethyl eleostearate, octyl 9,12-octadecadienoate, methyl eleostearate, monoglycerides of tung oil fatty acids, monoglycerides of soybean oil, sunflower, rapeseed, hempseed, sardine, cottonseed oil, and the like.

Another group of the epoxy-containing materials having internal epoxy groups include the epoxidized esters of unsaturated alcohols having the ethylenic group in an internal position and polycarboxylic acids, such as, for example, di(2,3-epoxybutyl)adipate, di(2,3-epoxybutyl) oxalate, di(2,3-epoxyhexyl)succinate, di(2,3-epoxyoctyl) tetrahydrophthalate, di(4,5-epoxydodecyl)maleate, di(2,3-epoxybutyl)terephthalate, di(2,3-epoxypentyl)thiodipropionate, di(2,3-epoxybutyl)citrate and di(4,5-epoxyoctadecyl)malonate, as well as the esters of epoxycyclohexanol and epoxycyclohexylalkanols, such as, for example, di(2,3-epoxycyclohexylmethyl)adipate and di(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate, 3,4-epoxyhexyl 3,4 - epoxypentanoate, 3,4-epoxycyclohexyl 3,4-cyclohexanoate, 2,3-epoxycyclohexylmethyl 2,3-epoxycyclohexanoate, and 3,4-epoxycyclohexyl 4,5-epoxyoctanoate, and the like.

Another group of materials having internal epoxy groups include epoxidized esters of unsaturated monocarboxylic acids and polyhydric alcohols, such as ethylene glycol di(2,3 - epoxycyclohexanoate), glycerol tri(2,3-epoxycyclohexanoate), and pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,11,13-diepoxyeicosanedioate, dibutyl 7,8,11,12-diepoxyoctadecanedioate, dioctyl 10,11-diethyl - 8,9,12,13 - diepoxyeicosanedioate, dicyclohexyl 3,4,5,6 - diepoxycyclohexane - dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Still another group includes the epoxidized hydrocarbons, such as epoxidized 2,2-bis(cyclohexenyl)propane, 2,2-bis(cyclohexenyl)butane, 8,10-octadecadiene and the like.

The polycarboxylic acids and anhydrides used in preparing the condensates of the present invention comprise the organic acids possessing at least two carboxyl groups and their corresponding anhydrides. The acids may be saturated, unsaturated, aliphatic, cycloaliphatic or aromatic and may be substituted with non-interfering groups, such as OH groups, halogen atoms, ether groups and the like. Examples of these acids and anhydrides include, among others, phthalic anhydride, isophthalic acid, terephthalic acid, adipic acid, succinic acid, suberic acid, azelaic acid, butylsuccinic acid, octadecylsuccinic acid, dodecylsuccinic acid, chlorosuccinic acid, dimer and trimer acids obtained by polymerizing unsaturated fatty acids, such as soybean oil fatty acids and the like, glutaconic acid, tricarballylic acid, aconitic acid, itaconic acid, diglycolic acid, maleic acid, maleic anhydride, 1,8-naphthalenic acid, tetrahydrophthalic anhydride, 3 - methoxyhexahydrophthalic anhydride, allylmalonic acid, 4-cyclohexene-1,3-dicarboxylic acid, 3-hexyl-4-cyclohexene-1,2-dicarboxylic acid, 3-methyl-3,5-dyclohexadiene-1,2-dicarboxylic acid, eicosenylsuccinic acid, diphenyldicarboxylic acid, thiodipropionic acid, sulfonyldibutyric oxydibutyric, 1,3,5-pentanetricarboxylic, trimellitic, dinicotinic, ditric, tartaric, methoxyphthalic, quinolinic and cinchomeronic acids.

Preferred polycarboxylic acids and anhydrides to be used are those prepared from the aliphatic, cycloaliphatic and aromatic dicarboxylic acids containing no more than 20 carbon atoms.

Particularly preferred are the polymeric fatty acids prepared from fatty acids, having up to and including about 20 carbon atoms. Precondensates prepared from these fatty acids, especially the dimer fatty acids, when cured with conventional epoxy curing agents produce coatings having increased resistance to ultraviolet light and improved weatherability, both inside and outside.

The condensates of the present invention are prepared by reacting the polybasic acid, polybasic acid anhydrides or mixtures thereof with the polyepoxide in the presence of tertiary amine borates, especially triethanolamine borate.

The amount of the reactants to be employed is critical. Unless the proper proportions are utilized, the resulting product will be an insoluble infusible product free of epoxy groups. In order to obtain the soluble epoxy-containing condensates of the present invention, it is essential that the acidic component be reacted with at least 1.5 times chemical equivalent amount of the polyepoxide. As used herein, and in the appended claims, the expression "chemical equivalent" in relation to the acidic and polyepoxide mixtures refers to the amount needed to furnish one epoxy group for every acidic group. Preferably, the acidic component and the polyepoxides are combined in chemical equivalent ratio of 1:2 to 1:4. If the acidic component is tri-functional or higher, a large excess of the polyepoxide is preferred.

If the acidic component is an acid, the method of adding is also important. It is usually desirable to slowly add the acid to the polyepoxide over a period of time in order to prevent conversion of the product to the insoluble infusible state.

The catalysts used in the process of the invention include the tertiary amine borates. These tertiary amine borates can be prepared by reacting at room temperature a tertiary amine with a borate such as, for example, methyl borate or triethyl borate. Suitable tertiary amine borates include, among others, trimethylamine borate, triethylamine borate, triethanolamine borate, triisopropanolamine borate, benzyldimethylamine borate, alpha-methylbenzyl dimethylamine borate, dimethylaminomethyl phenol borate, and tri(dimethylamino methyl)phenol borate. Particularly preferred is triethanolamine borate.

The catalysts are used in amounts preferably varying from about .05% to 3% by weight of the reactants.

Temperatures employed in the reaction will generally vary from about 50° C. to about 150° C. In most cases, the acidic component and the polyepoxide will be quite reactive and temperatures of the order of about 50° C. to 125° C. will be sufficient to effect the desired reaction. In other instances, it may be desirable to use higher temperatures, such as those from 125° C. to 175° C. Temperatures of 200° C. or over should generally not be employed.

The reaction is preferably conducted under atmospheric pressure, but it may be advantageous in some cases to employ subatmospheric or superatmospheric pressures.

The reaction may be conducted in the presence or absence of solvents or diluents. In most cases, the acidic component and polyepoxide will be liquid and the reaction may be easily effected without the addition of solvents or diluents. However, in some cases, whether either or both reactants are solids or viscous liquids it may be desirable to add diluents to assist in effecting the reaction, such as, for example, inert hydrocarbons as xylene, toluene, cyclohexane, and other materials as cyclohexanone, and the like.

If solvents are employed in the reaction and the formed condensate is to be used for coating compositions, the solvent may be retained with the condensate. Otherwise the solvent should be removed by any suitable method such as vacuum distillation and the like. If the condensate is not to be utilized for some time after its formation, it will also be desirable to remove the catalyst used in the preparation. This may be accomplished by neutralization, stripping or the like.

The finished condensate produced by the above process will vary from viscous liquids to solid brittle resins. The products will be substantially free of acidic groups and will contain epoxy groups. The products prepared from the use of acids as the acidic component will contain some free OH groups, but those prepared from the anhydrides will be relatively free of formed OH groups. The products of the invention are also soluble in solvents such as acetone, toluene, benzene, xylene, and the like. They are non-heat curable, i.e., they cannot be cured to an insoluble infusible stage by heat alone. The products will also be of much higher molecular weight than the basic polyepoxide from which they are formed, and in most cases will contain at least 2 of the polyepoxide units and preferably 3 to 10 polyepoxide units.

The products prepared from the dibasic acid components are linear and may be theoretically described as having the formula

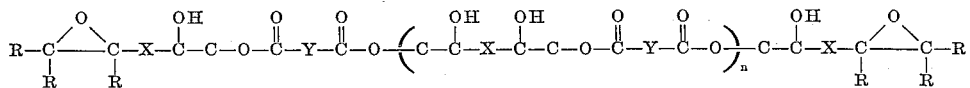

wherein R is hydrogen or hydrocarbon radical, X is organic radical, Y is residue of the dibasic acid and $n$ is an integer and preferably 0 to 10.

Part of the product prepared from two moles of the dibasic acid anhydrides and 3 moles of the diepoxide is believed to have a linear structure similar to the formula

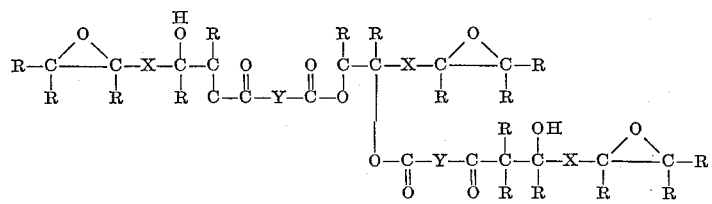

wherein R and X are as described above and Y is the residue of the dibasic anhydride.

The expression "linear" as used in the preceding two paragraphs and appended claims refers to lack of cross-linking but includes the possibility of side branching as noted in the structure shown in the preceding paragraph.

As the condensates of the present invention possess epoxy groups they may be cured with epoxy curing agents to form insoluble infusible products. For this purpose, epoxy curing agents which are acidic, neutral or alkaline may be added.

Examples of curing agents include, among others, alkalies like sodium or potassium hydroxides; alkali phenoxides like sodium phenoxide; carboxylic acids or anhydrides, such as formic acid, oxalic acid of phthalic anhydride; dimer or trimer acids derived from unsaturated fatty acids, 1,20-eicosanedioic acid, and the like; Friedel-Crafts metal halides like aluminum chloride, zinc chloride, ferric chloride or boron trifluoride as well as complexes thereof with ethers, acid anhydrides, ketones, diazonium salts, etc.; salts, such as zinc fluoborate, magnesium perchlorate and zinc fluosilicate; phosphoric acid and partial esters thereof including n-butyl orthophosphate, diethyl ortho-phosphate, hexaethyl tetraphosphate; amino compounds, such as, for example, diethylene triamine, triethylene tetramine, dicyandiamide, melamine, pyridine, cyclohexylamine, benzyldimethylamine, benzylamine, diethylaniline, triethanolamine, piperidine, tetramethyl piperazine, N,N-diethyl-1,3-propane diamine, 1,2-diamino-2-methylpropane, 2,3 - diamino-2-methylbutane, 2,4-diamino-2-methylpentane, 2,4-diamino-2,6-dimethyloctane, dibutylamino, distearylamine, diallyl amine, dicyclohexylamine, ethylcyclohexylamine, o-tolylnaphthylamine, pyrrolidine, 2-methylpyrrolidone, tetrahydropyridine, 2-methylpiperidine, 2,6-dimethylpiperidine, diaminopyridine, tetramethylpentane, metaphenylene diamine, and the like, and soluble adducts of amines and polyepoxides and their salts, such as described in U.S. 2,651,589 and U.S. 2,640,037.

Preferred curing agents are the polycarboxylic acids and acid anhydrides, the primary and secondary aliphatic, cycloaliphatic and aromatic amines and adducts of these amines and polyepoxides. In addition, urea-formaldehyde, melamine-formaldehyde and phenol-formaldehyde resins can also be used to cure the compositions of the invention, particularly when baked coatings are desired.

The amount of the curing agent employed may vary widely. In general, the amount of the curing agent will vary from about 0.5% to 200% by weight of the polyepoxide. The tertiary amines and $BF_3$-complexes are preferably employed in amounts varying from about 0.5% to 20% and the metal salts preferably employed in amounts varying from about 1% to 15%. The secondary and primary amines, acids and anhydrides are preferably employed in at least stoichiometric amounts, i.e., sufficient amount to furnish one amine hydrogen or one anhydride group for every epoxy group, and more preferably stoichiometric ratios varying from 1:1 to 25:1.

The condensates of the invention are particularly useful and valuable in the preparation of surface coating compositions. In this application, the condensate is usually mixed with one or more of suitable solvents or diluents, such as, for example, ketones, such as methyl isobutyl ketone, acetone, methyl ethyl ketone, isophorone, esters, such as ethyl acetate, Cellosolve acetate (ethylene glycol monoacetate), methyl Cellosolve acetate (acetate of ethylene glycol monoethyl ether), etc.; ether alcohols, such as methyl, ethyl or butyl ether or ethylene glycol or diethylene glycol, chlorinated hydrocarbons, such as trichloropane; hydrocarbons, such as benzene, toluene, xylene and the like, to give a mixture suitable viscosity for spraying, brushing or dipping, and then the necessary curing agent as described above may be added alone or in admixture with a suitable solvent. The cure of the coating compositions thus prepared may be preferably accomplished by the application of heat. Satisfactory cures are obtained generally with temperatures of 60° C. up to 200° C.

Additional materials may be added in the preparation of the coating composition to vary the properties. Such materials include pigments, dyes, stabilizers, plasticizers and various bodying agents as oils, resins and tar. Materials, such as coal tars, asphalts, and the like are particularly desirable for use when the coatings are to be employed for the treatment of roadways, floors and the like.

The coatings prepared from the condensates of the invention are characterized, as noted above, by their hardness, chemical resistance and good adhesions. The coatings also possess good flexibility, particularly in the case of the condensates prepared from aliphatic or cycloaliphatic acids or anhydrides, and good water resistance, particularly in the case of the condensates prepared from anhydrides.

Another important application of the products of the invention is in the preparation of laminates or resinous articles reinforced with fibrous materials. Although it is generally preferred to utilize glass cloth for this purpose, any of the other suitable fibrous materials in sheet form may be employed, such as glass matting, paper, asbestos paper, mica flakes, cotton bats, duck muslin, canvas, and the like.

In preparing the laminate, the sheets of fibrous material are first impregnated with the mixture containing the condensate and curing agent. This is preferably accomplished by dissolving the condensate and curing agent in acetone or a suitable solvent. The sheets of fibrous material are then impregnated with the mixture by spreading it thereon or by dipping or otherwise immersing them in the impregnant. The solvent is conveniently removed by evaporation and the mixture is cured by the application of heat as noted above.

Another important use of the compositions of the invention is the production of molded articles. A molding is first prepared by milling together a mixture of the condensate and curing agent with customary fillers and mold release agents. Usually the milled mixture is set up so that a fusible resin is first obtained. The milled mixture is then ground and molded articles obtained therefrom with conversion of the fusible resin into the infusible state with use of molding machines such as those for compression molding or transfer molding. If desired, fusible milled mixtures may be prepared in preformed pellets and the like.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight. The OH value and acidity of the epoxy resins prepared in the examples are each expressed in equivalents per 100 grams.

EXAMPLE I

This example illustrates that epoxy-containing condensates prepared using triethanolamine borate catalyst have longer shelf lives than condensates prepared using triethanolamine.

270 parts of Empol 3065–S (a viscous aliphatic polymeric acid produced by the polymerization of unsaturated fatty acids at mid-molecule and containing 75% $C_{36}$ dibasic fatty acid and 25% $C_{54}$ tribasic fatty acid, acid value of 186–194, saponification value of 191–199 and a neutralization equivalent of 289–301) was dissolved in 400 parts of Polyether A by heating to 100° C. in a reaction flask equipped with stirrer, condenser and thermometer. At this point 0.4 part of triethanolamine borate was added in 50 parts of Empol 3065–S. The temperature was then increased to 150° C. and the reaction continued until the acid number was less than 2 (2 hours) at 150° C. The product was then cooled to 90° C. and 5 parts of Cellosolve solvent (mono-ethylether of ethylene glycol) was added and stirred for 10 minutes. The resulting product was a solid resin having an epoxy value of 0.138 eq./100 g., an OH value of 0.195 and an acidity of 0.0003.

The procedure was essentially repeated except that triethanolamine was used instead of triethanolamine borate and the reaction continued for 6 hours at 150° C. The resulting product was a solid resin having an epoxy value of 0.135 eq./100 g., an OH value of 0.159 and an acidity of 0.002.

The viscosity of the resin was determined initially and at subsequent periods to determine the relative shelf life of the respective condensates. For the viscosity tests, 75% solutions in xylene were made up. The results are tabulated as follows:

| Catalyst | Reaction Time, hrs. at 150° C. | Acid No. | Viscosity, Poises | | | |
|---|---|---|---|---|---|---|
| | | | Initial | One week at 65° C. | Two weeks at 65° C. | Four weeks at 65° C. |
| Triethanolamine | 6 | 1.8 | 36.1 | 47.8 | 54.2 | 89.6 |
| Triethanolamine borate | 2 | 0.7 | 29.5 | 34.2 | 37.0 | 50.2 |

The above data indicates that the reaction time required to prepare the epoxy-containing condensate was reduced when triethanolamine borate was used as the catalyst. Likewise, the viscosity data clearly shows that the use of triethanolamine borate catalyst produces a condensate possessing a longer shelf life as illustrated by the smaller change in viscosity with time.

EXAMPLE II

This example illustrates the preparation and some of the properties of an epoxy-containing condensate obtained from Polyether A and azelaic acid using triethanolamine borate.

400.5 parts of Polyether A was charged to the reaction vessel and heated to 150° C. At this time 0.4 part of triethanolamine borate (0.1% based on Polyether A) were added together with 25 parts of azelaic acid. The temperature was kept at about 150° C. and 74.5 parts of azelaic acid was added in three nearly equal portions throughout the following 2 hours. The resulting product was a solid having an epoxy value of 0.218 eq./100 g., an OH value of 0.167 and an acidity of 0.001.

A coating composition was prepared by mixing the above-described solid resin in a solvent containing 15% diacetone alcohol, 12.5% methyl isobutyl carbinol, 12.5% methyl isobutyl ketone, and 60% xylene and 4.4 parts per hundred parts of adduct of diethylene triamine and the mixture spread on tin panels and cured at 65° C. for 16 hours. The resulting product was a hard tough flexible coating which was unaffected for 1 hour's immersion in paint base spirits and exhibited no whitening or softening after 33 days at 77° F. in water.

EXAMPLE III 419 parts of Polyether A were reacted with 81 parts of adipic acid in the presence of 0.42 part of triethanolamine borate at 150° C. The resulting product was a solid having an epoxy value of 0.215 eq./100 g., an OH value of 0.29 and an acidity of 0.001.

A coating composition was prepared by mixing the above-described resin in a solvent containing 15% diacetone alcohol, 12.5% methyl isobutyl carbinol, 12.5% methyl isobutyl ketone and 60% xylene and 4.6 parts per hundred of resin of diethylene triamine and the mixture spread on steel panels and cured at 150° C. for 15 minutes. The resulting product was a hard tough flexible coating which is unaffected by boiling water.

EXAMPLE IV 410 parts of Polyether A and 90 parts of isophthalic acid were placed in a reaction flask as described in Example I and heated to 100° C. To this mixture 0.41 part of triethanolamine borate was added and the temperature raised to about 150° C. After about 1½ hours the acid number was 2.3 and the heat was removed. The resulting product had a Durrans' Mercury Method melting point of 76° C., an epoxy value of 0.215 eq./100 g., an OH value of 0.260 and an acidity of 0.001.

A coating composition is prepared as in Example III. The cured film is hard and tough and has excellent resistance to solvents and boiling water.

EXAMPLE V 614 parts of Polyether C were added to 186 parts of Empol 1014; (a viscous aliphatic, dibasic acid produced by the polymerization of unsaturated fatty acids at mid-molecule and containing 1% $C_{18}$ monobasic fatty acids, 95% $C_{36}$ dibasic fatty acid and 4% $C_{54}$ tribasic fatty acid; acid value of 188–193; saponification value of 194–198 and a neutralization equivalent of 292–298) at 135° C. The reactants were heated to 150° C. and 0.48 part of triethanolamine borate were added. After 1½ hours of heating at 150° C. the acid number was 2.92. The resulting product was a solid having an epoxy value of 0.082 eq./100 g., an OH value of 0.271 and an acidity of <0.001.

A coating composition was prepared by mixing the above-described resin in a solvent containing 15% diacetone alcohol, 12.5% methyl isobutyl carbinol, 12.5% methyl isobutyl ketone, and 60% xylene and 1.48 parts per 100 parts of resin of diethylene triamine and the mixture spread on tin panels and cured at 65° C. for 16 hours. The resulting coating was hard, tough and flexible and was unaffected by boiling water.

EXAMPLE VI 731 parts of Polyether C and 69 parts of azelaic acid were reacted in the presence of 0.48 part of triethanolamine borate by the same procedure as in Example V. The resulting product was a solid having an epoxy value of 0.102 eq./100 g., an OH value of 0.331 and an acidity of <0.001.

A coating composition is prepared as in Example V. The cured film is hard and tough and has excellent resistance to solvents.

EXAMPLE VII 690.4 parts of Polyether D were placed in a reaction flask and heated to 150° C. Then 109.6 parts of Empol 1014 (a dimer fatty acid described in Example V) and 0.48 part of triethanolamine borate were added. The resulting product had an epoxy value of 0.043 eq./100 g., an OH value of 0.314 and an acidity of <0.0001.

A coating composition is prepared by combining 100 parts of the above adduct with 0.9 part of diethylenetriamine and xylene. This mixture is spread on steel panels and cured at 150° C. for 30 minutes. The resulting films are hard and flexible.

EXAMPLE VIII 762.4 parts of Polyether D were melted in a reaction vessel at 150° C. Then 0.48 part of triethanolamine borate were added and 37.6 parts of azelaic acid were added over about a 1½-hour period while the temperature was kept at about 150° C. The resulting product had an epoxy value of 0.049, an OH value of 0.353 and an acidity of <0.001.

A coating composition is prepared as in Example VII. The cured film is tough and flexible and has excellent resistance to water and solvents.

EXAMPLE IX

Example I is essentially repeated except that triisopropanolamine borate is used as the catalyst. Similar improved results are obtained.

EXAMPLE X

Related results are obtained when Polyether A is replaced in Example II with equivalent amounts of each of the following: diglycidyl ester of isophthalic acid, epoxidized 2,2 - bis(cyclohexenyl)propane, epoxidized, ethylene glycol di(tetrahydrobenzoate) and epoxidized tetrahydrobenzyl tetrahydrobenzoate.

EXAMPLE XI

Example III is substantially repeated except that the adipic acid is replaced with an equivalent amount of a polybasic fatty acid containing 21% dimer and 79% trimer; and having a neutralization equivalent of about 300 and an acid value of about 190 and a saponification value of about 200. The resulting product is an acetone-soluble resin having a high epoxy value and substantially no acidic groups.

EXAMPLE XII 300 parts of Polyether B and 50 parts of isophthalic acid anhydride are placed in a reaction flask and the mixture heated to 100° C. to dissolve the mixture. 0.3 part of triethanolamine borate is added and the mixture maintained at 130° C. for several hours. The resulting product is a solid having an epoxy value of about 0.17 eq./100 g. The film cured with diethylenetriamine was hard and flexible and did not swell or whiten after immersion in water for 33 days at 77° F.

EXAMPLE XIII 2.0 equivalents of Polyether E are placed in a reaction flask and 0.3 parts of triethanolamine borate are added. A 50:50 mixture by weight of adipic acid and sebacic acid anhydride is then slowly added over a period of about 4 hours while the temperature is kept at about 125° C. The resulting product is an acetone-soluble resin having a high epoxy value and very low acidity.

A coating composition is prepared as in Example III. The cured film is hard and tough.

I claim as my invention:

1. A process for preparing a linear acetone-soluble non-heat curable epoxy-containing condensate which comprises adding a polymerized fatty acid prepared by polymerizing an unsaturated fatty acid having up to about 20 carbon atoms to 1.5–4 times the chemical equivalent amount of a polyepoxide containing more than one vic-epoxy group and having no additional substituent capable of reacting with said polymeric fatty acid other than hydroxyl and epoxy groups in the presence of 0.05–3% by weight, based on the reactants, of a tertiary amine borate prepared by reacting a tertiary amine with methyl borate at room temperature, the expression "equivalent amount" as used herein referring to that amount needed to furnish one acidic group per epoxy group.

2. A process as in claim 1 wherein the polyepoxide is is a polyglycidyl ether of a polyhydric compound of the group consisting of polyhydric alcohols and polyhydric phenols.

3. A process as in claim 1 wherein the polyepoxide is an aliphatic organic compound possessing at least one internal vic-epoxy group.

4. A process as in claim 1 wherein the polyepoxide is a diglycidyl ester of isophthalic acid.

5. A process as in claim 1 wherein the polyepoxide is a polyglycidyl ether of glycerol.

6. A process for preparing a linear acetone-soluble non-heat curable epoxy-containing condensate which comprises adding a polymerized fatty acid prepared by polymerizing an unsaturated fatty acid having up to about 20 carbon atoms to 1.5–4 times the chemical equivalent amount of a diglycidyl ether of 2,2-bis(4-hydroxyphenyl)-propane in the presence of 0.05–3% by weight, based on the reactants, of triethanolamine borate, the expression "equivalent amount" as used herein referring to that amount needed to furnish one acidic group per epoxy group.

7. A process as in claim 6 wherein the polymerized fatty acid is a viscous aliphatic polymeric acid containing at least 75% $C_{36}$ dibasic fatty acid.

8. A process as in claim 6 wherein the polymerized fatty acid is a viscous aliphatic polymeric acid containing about 95% $C_{36}$ dibasic fatty acid and about 5% $C_{18}$ monobasic and $C_{54}$ tribasic fatty acid.

References Cited by the Examiner

UNITED STATES PATENTS

| | | | |
|---|---|---|---|
| 2,773,043 | 12/1956 | Zukas | 260—47 |
| 2,871,454 | 1/1959 | Langer | 260—18 |
| 2,949,441 | 8/1960 | Newey | 260—47 |
| 2,970,130 | 1/1961 | Finestone | 260—47 |
| 2,970,983 | 2/1961 | Newey | 260—47 |
| 3,052,650 | 9/1962 | Wear et al. | 260—37 |

OTHER REFERENCES

Lee et al.: Epoxy Resins; page 113, McGraw-Hill; New York, 1957.

Chem. Eng. News, 36, No. 29, July 1958, pp. 112 and 113.

LEON J. BERCOVITZ, *Primary Examiner.*

ALPHONSO D. SULLIVAN, *Examiner.*